J. H. A. WIESENER.
DRIER FOR YEAST AND THE LIKE.
APPLICATION FILED FEB. 7, 1914.
1,129,031.
Patented Feb. 16, 1915.
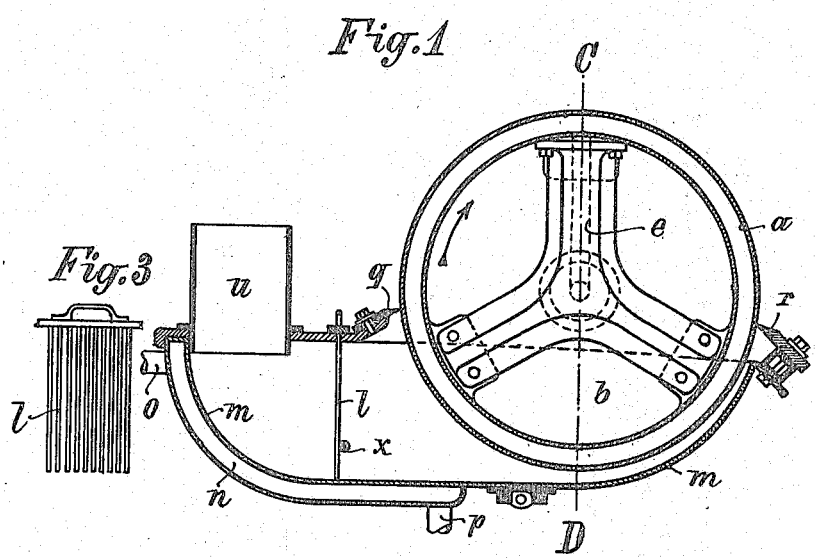
Fig. 1
Fig. 3
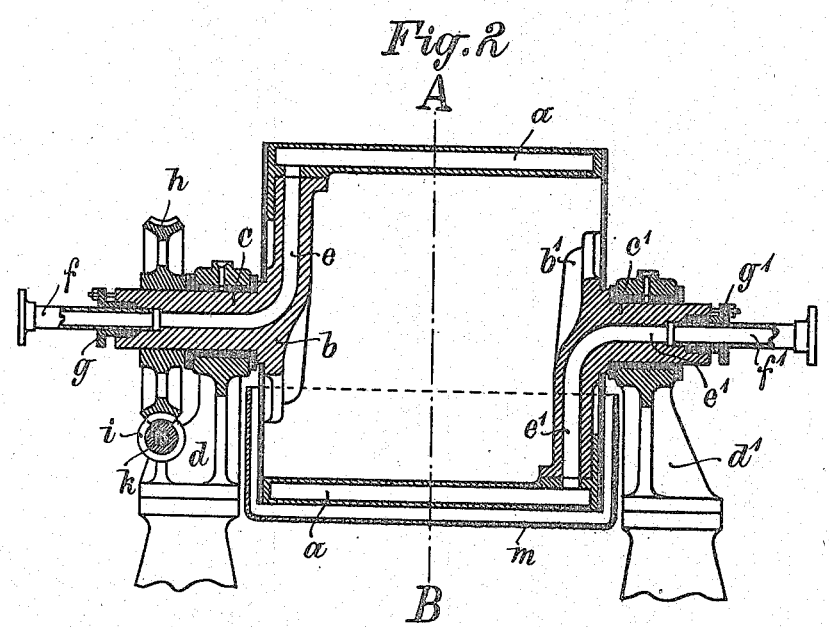
Fig. 2
Witnesses
F. M. Meyer
E. O. Crocker
Inventor
J. H. A. Wiesener
Atty.

UNITED STATES PATENT OFFICE.

JOHANN HEINRICH AUGUST WIESENER, OF HAMBURG, GERMANY.

DRIER FOR YEAST AND THE LIKE.

1,129,031.  Specification of Letters Patent.  Patented Feb. 16, 1915.

Application filed February 7, 1914. Serial No. 817,371.

*To all whom it may concern:*

Be it known that I, JOHANN HEINRICH AUGUST WIESENER, manufacturer, a subject of the German Emperor, residing at No. 103 Steindamm, Hamburg, Germany, have invented new and useful Improvements Relating to Driers for Yeast and the like, of which the following is a specification.

This invention relates to a drier for yeast and the like, having a rotary heating drum and a scraper for the removal of the dried yeast from the surface of the heating drum; according to the invention an improved construction of drum is used, formed of a heating jacket through which a heating medium is caused to circulate continuously, while means are provided for insuring that only a uniform layer of yeast to be dried can cling to the drum. The heating medium is supplied to the jacket of the drum in the well known manner through one of the trunnions of the drum, while the other trunnion serves for the outflow of the steam or condensed water. Each trunnion is connected with the heating jacket by a number of arms of which one is hollow in order to conduct the heating medium respectively from one trunnion into the heating jacket and from the heating jacket out through the other trunnion.

A further essential feature of the invention is the employment and construction of the trough, adapted to receive the material to be dried, and in which the drum turns. The bottom of this trough is completely or partly hollow for the passage of a heating medium (steam) for the purpose of effecting the preliminary heating of the material to be dried which is contained therein.

An example of construction of the invention is illustrated in the accompanying drawings in which:—

Figure 1 is a cross-section on the line A—B of Fig. 2 and Fig. 2 is a section on the line C—D of Fig. 1. Fig. 3 is a detail.

The drum comprises the heating jacket $a$ secured to two sets of arms $b$, $b'$, each of which sets is provided with a trunnion $c$, $c'$ for supporting the drum, these trunnions being arranged to turn in the supports $d$ and $d'$. Along the axis of each trunnion $c$ and $c'$ is formed a passage $e$, $e'$ which continues through one of the arms $b$, $b'$ and terminates in the heating jacket $a$. Pipes $f$ and $f'$ are packed in stuffing boxes $g$, $g'$ in the ends of the trunnions $a$, $a'$, and serve for the supply and outflow of the heating medium. On the trunnion $c$ is mounted a worm wheel $h$ which gears with a worm $i$ keyed to a shaft $k$ mounted in the support $d$, and driven by any suitable means.

The trough $m$ in which the drum is suspended, has a bottom, the whole or part of which is made double-walled to form a chamber for the reception of a heating medium (steam) which is supplied thereto through the pipe $o$ and passes out through the pipe $p$. In the trough $m$ is mounted a vertical rake $l$, having its lower edge resting on the bottom of the said trough. Behind and against the rake $l$ is a cross bar $x$. The yeast is supplied in solid form to the trough, behind this plate, through a hopper $n$, and the yeast can only pass through the rake into the part of the trough below the drum, gradually as it only becomes liquefied by the application of heat. On the trough $m$ is advantageously mounted an adjustable flat plate $q$ which fits as closely as required against the periphery of the heating jacket $a$ in order to prevent the passage of any lumps or foreign bodies of any description, while permitting even at the commencement of the drying operation, only a thin layer of the yeast to be dried to cling to the drum. Opposite the flat plate $q$ there is provided on the trough $m$ or in the machine frame a scraper $r$, the sharp edge of which rests against the periphery of heating jacket $a$.

The operation is as follows:—The drum is rotated and at the same time steam is admitted through the pipes $f$ and $o$ into the heating jacket $a$ and the hollow bottom $n$ of the trough $m$. When the jacket $a$ and the trough $m$ have been sufficiently warmed, the yeast to be dried is supplied to the latter. By the action of the heat the yeast is easily liquefied and drawn around by the drum rotating in the direction of the arrow Fig. 1. By reason of the provision of the flat plate $q$ only a thin layer clings to the peripheral surface of the jacket $a$ and after passing over a certain distance and being completely dried it is removed by the scraper $r$. The thin layer of material may if desired be worked by suitably arranged pressing rollers or the like, on its passage from the trough $m$ to the scraper $r$.

What I claim is:—

1. A drier for yeast and the like comprising a trough, a cylinder revoluble in the said trough, means for heating the cylinder and the trough, a rake within the trough reaching to the bottom thereof whereby the yeast is fed to the cylinder in liquid state, and means for collecting and removing the yeast from the roller, the parts arranged as and for the purpose described.

2. A drier for yeast and the like comprising a double-walled trough, a double-walled cylinder revoluble within the said trough, means for supplying heat between the walls of the cylinder and the trough, the said trough having a hopper, a rake within the tank between the hopper and the cylinder, and means for collecting a predetermined quantity of yeast on the cylinder and removing it therefrom, the parts arranged as and for the purpose described.

3. A drier for yeast and the like comprising a trough having a double-wall throughout a portion of its length, a double-walled cylinder revoluble within the said tank, the tank provided with a hopper, a rake within the tank between the hopper and the cylinder providing means whereby the yeast is supplied to the roller in a liquid state and allowed to adhere thereto, means for regulating the amount of yeast adhering to the roller and means for removing it therefrom, the parts arranged as and for the purpose described.

In testimony whereof I have signed my name to this specification in the presence of two subscribing witnesses, this 24th day of January, 1914.

JOHANN HEINRICH AUGUST WIESENER.

Witnesses:
EDWARD PETER HEINRICH ERNSTEIN,
ERNEST H. L. MUMMENHOFF.